No. 612,235. Patented Oct. 11, 1898.
C. M. DISSOSWAY.
NUT LOCK.
(Application filed Apr. 9, 1898.)
(No Model.)
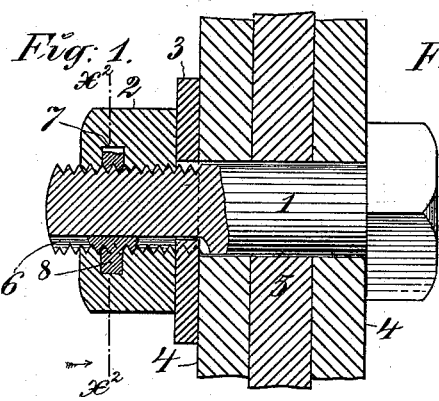
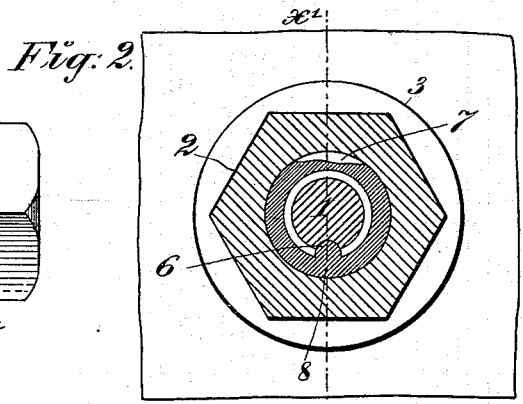
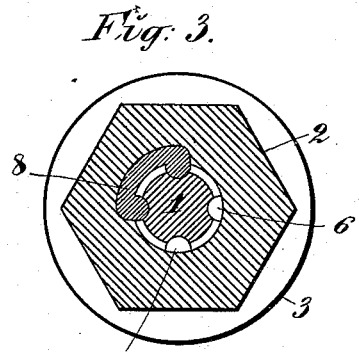
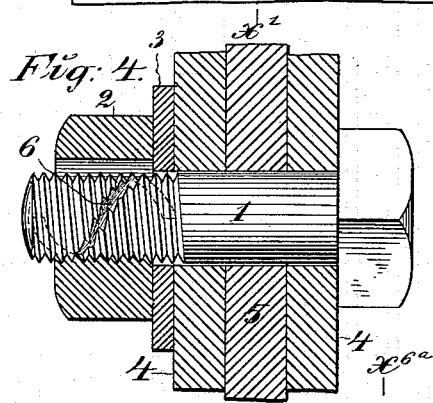
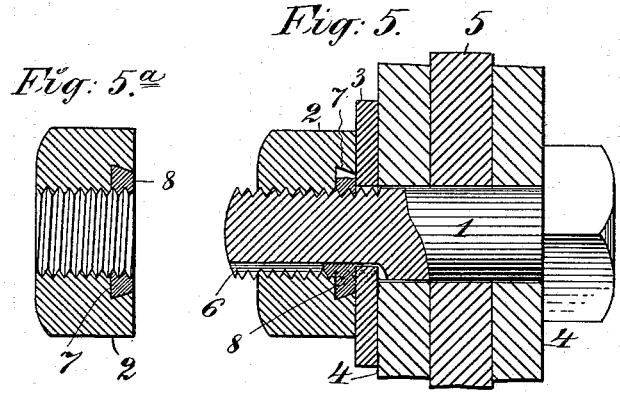
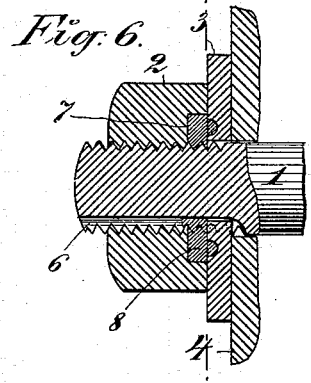
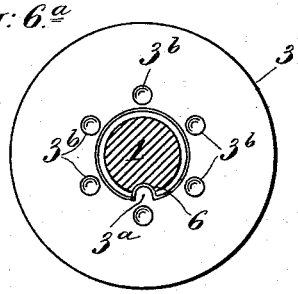
WITNESSES:
INVENTOR
ATTORNEY

UNITED STATES PATENT OFFICE.

CROWELL M. DISSOSWAY, OF NEW YORK, N. Y., ASSIGNOR OF ONE-HALF TO JOHN GOODCHILD, GUARDIAN, OF SAME PLACE.

NUT-LOCK.

SPECIFICATION forming part of Letters Patent No. 612,235, dated October 11, 1898.

Application filed April 9, 1898. Serial No. 677,046. (No model.)

*To all whom it may concern:*

Be it known that I, CROWELL M. DISSOSWAY, a citizen of the United States, residing in the borough of Manhattan and city, county, and State of New York, have invented certain new and useful Improvements in Nut-Locks, of which the following is a specification.

This invention relates to a means for locking a nut on a bolt against unscrewing from jolting or jarring, the nut being free, however, for removal with a wrench by the application of a little more force to start it than is ordinarily required.

The accompanying drawings illustrate an embodiment of the invention.

Figures 1 and 2 show the preferred construction, the former being a section along the axis of the bolt at line $x'$ in Fig. 2 and the latter a transverse section through the bolt and nut at line $x^2$ in Fig. 1. Fig. 3 is a section similar to Fig. 2, showing a plurality of grooves in the bolt and a partly annular recess in the nut. Fig. 4 is a section similar to Fig. 1, showing a form of the invention where the recess in the nut extends axially and the groove in the bolt extends spirally. Fig. 5 is a view similar to Figs. 1 and 4, showing the recess in the nut opening out at its inner face and closed by the washer or plate against which the nut is screwed up; and Fig. $5^a$ shows the nut of the construction in Fig. 5 detached. Figs. 6 and $6^a$ are views illustrating a modified construction, the former being a sectional view similar to Fig. 5 and the latter a section on line $x^{6a}$ in Fig. 6.

So far as the article is concerned this invention consists, essentially, in a bolt and nut having recesses adapted to be put in register when the nut is screwed up on the bolt and one of said recesses filled p _arily with a hard and easily-fusible metal, and so far as the manner of using is concerned it consists, essentially, in first screwing on the nut and then heating the nut and bolt up to a temperature sufficient to fuse the metal in the said recess and cause a part of it to flow into the recess in the other part, whereby in cooling it forms a hard metallic bridge-key which locks the nut against rotation on the bolt unless sufficient force be applied to break said key.

Practically it is preferred to carry out the invention by forming an internal annular recess in the nut to receive the fusible metal—such as type-metal, for example—and to form a longitudinal groove in the threaded part of the bolt. This construction is illustrated in Figs. 1 and 2, wherein 1 is the bolt; 2, the nut thereon; 3, a washer; 4 4, fish-plates, and 5 the web of a railway-rail. The washer, fish-plates, and rail are shown merely to illustrate one adaptation of the bolt. In the bolt is formed a groove-like recess 6, which may have any suitable form in cross-section, and in the nut is formed, preferably near its outer face, an annular recess 7, which is filled primarily with an easily-fusible metal 8, such as type-metal. This metal 8 may be put into the recess 7 in any manner desired. It can be melted and poured in and then allowed to harden. If put in before the nut is tapped or screw-threaded, the screw will be cut in the metal 8.

Preferably the operation will be as follows: The bolt is set with the recess 6 at the lower side and the nut screwed on and up snugly against the washer or other part. Heat is now applied to the nut until the metal 8 fuses and a part of it flows down into the recess 7. When the parts are allowed to cool, the metal 8 will form a bridge-key or spline which locks the nut against rotation on the bolt. This is the condition illustrated in Figs. 1 and 2.

Where the recess 7 in the nut is endless or extends entirely around, it will always be in register with the recess 6 in the bolt at some point; but it is not necessary that it should be endless or ring-like, nor need the recesses in the bolt be limited to one, as there may be several. Fig. 3 shows a partly annular recess in the nut and a plurality of recesses in the bolt. In this construction one of the recesses in the bolt will always register with the recess in the nut. More than o recess may be formed in the nut, but one 'l suffice and it is the cheaper construction.

Fig. 4 shows a form in which the recess in the nut extends hrough it axially, like a keyway, and the recess in the bolt extends spirally about it, but oppositely to the direction of the screw-thread thereon. There may be two or more of these recesses in the nut and two or more spiral recesses in the bolt. This will be obvious as a mere duplication.

Figs. 5 and 5ª illustrate a construction slightly different from that of Figs. 1 and 2, the difference residing in the annular recess 7 being in and opening out from the inner face of the nut. In this construction the fusible metal 8 does not extend out beyond the inner face of the nut. Fig. 5 shows the nut locked on the bolt, and Fig. 5ª shows the nut primarily provided with the metal 8 and before it is screwed onto the bolt. Where the recess 7 is at the inner face of the nut, as distinguished from the outer face, it should be in some manner undercut, as shown, so as to prevent the nut from drawing away from it, as it might do if the recess was circular and concentric with the bolt.

Preferably the containing-recess for the metal 8 will be in the nut, as this recess should have a little greater capacity than the other; but it will be obvious that the metal 8 might be put in a recess in the bolt, or, indeed, some of the metal 8 might be put in both recesses.

The metal 8 should have the characteristics of a rather low melting-point, hardness when cold, and, by preference, the quality of expanding or not shrinking when it cools. Hence type-metal or some similar alloy is preferred. A soft very malleable metal forced in as a key, such as has been proposed, is not satisfactory. The key should be hard and comparatively unyielding, and when in place it should fit tightly, so as to allow no movement of the nut.

Figs. 6 and 6ª illustrate a construction wherein the washer 3 is prevented from rotation on the bolt 1 by a projection 3ª, which engages the groove 6 in the latter, and said washer has one or more recesses 3ᵇ in its face coincident with the metal 8 in the recess 7 in the nut. Thus the washer is made in substance a part of the bolt, and the nut is locked to it by the metal 8 entering the recesses 3ᵇ.

I am aware that it has been proposed to secure a nut by heating it to melt solder inserted in a hole or recess in the nut; but this mode employs no mold-recess in the bolt to receive the molten metal and form a bridge-key and the solder will not of course adhere to the screw-threads of an ordinary iron bolt. I do not claim this, nor do I claim the use of a driven key of metal thin enough or soft enough to be cut by the nut-threads in unscrewing, said key being inserted in coincident keyways axially arranged in both nut and bolt. In my construction neither the metal-reservoir in one part nor the bridge-key would in the other part need be axially arranged, and the one in the nut will be, by preference, situated wholly interiorly. My construction enables the key to be formed when the nut has been screwed up tight, no care being taken to effect coincidence of keyways.

Having thus described my invention, I claim—

1. A nut and bolt having, one a recess charged with a readily-fusible, hard, key-metal and the other a key mold or recess, said recesses adapted to be brought into coincidence when the nut is on the bolt, whereby when the nut and bolt are heated up to the point of fusion of the said charge of metal the latter will flow into the coincident mold and form a bridge-key to lock the nut against rotation, substantially as set forth.

2. A nut and bolt, the former having in it a recess charged with a readily-fusible, hard, key-metal, and the latter having a key mold or recess, said recesses adapted to be brought into coincidence when the nut is on the bolt, whereby when the said metal is fused by heating the nut and bolt, it will flow into the coincident key-mold and form a bridge-key to lock the nut against rotation, substantially as set forth.

3. The combination with a bolt having in it one or more key molds or recesses, extending across its threads in a longitudinal direction, and a nut, having in its interior an annular reservoir open to the threads on the bolt, of a charge of readily-fusible key-metal in said annular reservoir, substantially as and for the purposes set forth.

4. A nut and bolt having, one a recess charged with a readily-fusible, hard metal which expands in cooling and the other having a key mold or recess adapted to be brought into coincidence with said charge when the nut is on the bolt, whereby when the nut is heated up to the point of fusion of said metal the latter will form a closely-fitting bridge-key, substantially as set forth.

In witness whereof I have hereunto signed my name, this 7th day of April, 1898, in the presence of two subscribing witnesses.

CROWELL M. DISSOSWAY.

Witnesses:
HENRY CONNETT,
PETER A. ROSS.